US006036157A

United States Patent [19]

Baroin et al.

[11] Patent Number: 6,036,157

[45] Date of Patent: Mar. 14, 2000

[54] ADJUSTMENT SLIDE FOR AUTOMOBILE VEHICLE SEATS AND ADJUSTMENT SYSTEM INCLUDING TWO SUCH SLIDES

[75] Inventors: Claude Baroin, St Paul; René Rohee, La Chapelle Biche, both of France

[73] Assignee: Bertrand Faure Equipments S.A., Boulogne Cedex, France

[21] Appl. No.: 09/015,067

[22] Filed: Jan. 28, 1998

[30] Foreign Application Priority Data

Jan. 28, 1997 [FR] France ................................ 97 01032

[51] Int. Cl.[7] ................................................ A47C 1/023

[52] U.S. Cl. ...................................... 248/429; 297/344.1

[58] Field of Search ................................ 248/429, 430; 296/65.13, 65.14; 297/344.1

[56] References Cited

U.S. PATENT DOCUMENTS

| | | | |
|---|---|---|---|
| 2,636,545 | 4/1953 | Johnson | 248/430 |
| 3,450,425 | 6/1969 | Leonhardt | 248/430 X |
| 4,168,051 | 9/1979 | Terada | 248/429 |
| 4,238,099 | 12/1980 | Hunwicks | 248/430 |
| 4,572,469 | 2/1986 | Rees | 248/430 |
| 4,733,845 | 3/1988 | Maiwald | 248/429 |
| 4,961,559 | 10/1990 | Raymor | 248/429 |
| 5,172,882 | 12/1992 | Nini | 248/430 |
| 5,806,825 | 9/1998 | Couasnon | 248/429 |
| 5,918,847 | 7/1999 | Couasnon | 248/430 |
| 5,931,436 | 8/1999 | Rohee | 248/430 |

FOREIGN PATENT DOCUMENTS

| | | | |
|---|---|---|---|
| 2232464 | 1/1975 | France . | |
| 2359006 | 2/1978 | France | 248/430 |
| 2406538 | 5/1979 | France . | |
| 2656262 | 6/1991 | France . | |
| 2736311 | 1/1997 | France . | |
| 1 430 826 | 11/1968 | Germany . | |
| 2426900 | 12/1974 | Germany | 248/429 |
| 2253999 | 9/1992 | United Kingdom . | |

*Primary Examiner*—Stephen S. Wentsler

*Attorney, Agent, or Firm*—Pollock, Vande Sande & Amernick

[57] ABSTRACT

A vehicle seat adjustment system has at least two tracks and each track includes: a stationary female number, a male member slidably mounted in the female member, and a unitary locking device for removably securing the male member in the female member. The device has a first end secured to the female member, an intermediate flexible section, and a vertically displaceable second end section. The second end section has an L-shaped flange received within a slot formed in an upper surface of the female member. Cutouts are longitudinally formed along a bend in the flange and normally engage: a) longitudinally formed notches in an upper surface portion of the male member; and b) longitudinally formed notches in a flange return of the female member, the return underlying an outwardly extending flange of the male member. Vertical displacement of the locking device removes the cutouts from the engaged notches thereby allowing sliding movement of the male member within the female member.

11 Claims, 3 Drawing Sheets

ADJUSTMENT SLIDE FOR AUTOMOBILE VEHICLE SEATS AND ADJUSTMENT SYSTEM INCLUDING TWO SUCH SLIDES

FIELD OF THE INVENTION

The invention concerns a slide for adjusting the longitudinal position of an automobile vehicle seat and a position adjustment system using two such slides.

BRIEF DESCRIPTION OF THE PRIOR ART

Conventionally, slides must ensure two functions which are the adjustment of the position by the sliding of a female section in relation to a male section and securing in position once the adjustment has been made.

With non-motorized slides, the securing operation is conventionally performed by a lock attached to one of the sections and which can mate with the notches on the other section. The position can be adjusted by the sliding of a female section attached to the frame of a seat in relation to a male section attached to the floor of the automobile vehicle, after unlocking by means of a control element acting on the lock to release it.

We already know of various slide locking systems based on the mating of the teeth of a comb of a lock attached to the movable portion of the slide with notches made on the fixed section, the movable portion being attached to the seat and the fixed section being attached to the floor of the vehicle. For example, French Patent document FR-A-2 656 262 describes a system including a female section, generally U-shaped, with two flanges and a male section sliding longitudinally between the flanges of the female section. The securing lock consists of a plate located on the outside against a side flange of the female section and hinged around an axis located on the outside of the flange. A hole made in the flange of the female section, inside which the lock engages, guides and holds in position the lock. The lock also includes a movable portion which moves vertically and is located inside the slide, the movable portion including a locking lug which enters into a window made by stamping a hole in the lower portion of the U-shaped flange of the female section. The locking lug includes locking means, consisting of the teeth of a comb and which mates with the notches made on the lower edge of the flange return of the male section. The lock is held in locking position by means of a spring located on the outside of the slide and the ends of the spring are held both by the lock and by a hole made in the flange of the female section. The locking device consists of an arch located outside and arranged to move the movable portion vertically by means of two lugs intended to attach the device, thus enabling the teeth of the comb plate to be released from the notches.

This locking system requires the making of many stampings or cutouts in the female section and the use of several parts, not conducive to easy and rapid installation of the slide.

We also know of a slide lockable in position such as described in document FR-A-2 736 311, including a U-shaped female section, a male section and a lock ensuring the longitudinal locking of the male section on the female section. The lock is formed by the end section of an elastically flexible blade placed inside the slide and attached, at a certain distance from the end portion, to the male section. The said end section is equipped with teeth which mate, in a locking position, with the notches made on the female section. The slide includes an unlocking bar, the arms of which penetrate inside the slide and act on the lock to disengage, by elastic bending of the blade, the said teeth from the said notches.

BRIEF SUMMARY OF THE INVENTION

The present invention aims at simplifying the design of locking systems of the first type described above by reducing the number of parts required and by increasing the speed with which such a system can be installed, while conserving similar unlocking control means, which installation is easily achievable via the outside of the slides.

With these targets in mind, the subject of the invention is an adjustment slide for automobile vehicle seats including a female section generally U-shaped with two flanges and which slides longitudinally in relation to a male section, and including a lock securing the female section on the male section and an unlocking control device, the lock including a movable portion which can move vertically, the movable portion including a locking lug which enters into a window made in the female section, the said locking lug including, at its end located inside the female section, locking means which mate with the notches made on the male section, and the unlocking control device, located on the outside of the sections, being arranged so as to move the said movable portion to free the said locking means from the notches, characterized in that the lock includes, successively, an attachment lug attached to the female section, a flexible portion and the movable portion, the window is made in an upper face of the female section and the notches are made on an upper edge of at least one flange of the male section, and the unlocking control device is arranged so as to move the said movable portion upwards by elastically deflecting the flexible portion.

Thanks to the invention, the number of parts in the locking system is reduced as one part ensures both the locking and the elastic recall. The installation of the locking system is thus simplified together with the later installation of the unlocking control device which is achieved via the outside of the slide.

Preferably, the movable portion of the lock is U-shaped in section and includes two flanges facing downwards, the first flange forming the said locking lug and the second flange extending to against one of the flanges of the female section and including means for connection with the unlocking control device.

Thanks to this arrangement, the two flanges of the U forming the movable portion of the lock fit around the flanges of the sections, thus vertically guiding the movable portion.

According to a first design of the invention, the movable portion of the lock includes a flange forming the locking lug and is extended by a horizontal folded portion crosswise to the direction of the slide, and the locking means consist of cutouts which are made in the angle formed between the flange and the folded portion and which mate with the notches located on the upper edge of a flange of the male section.

According to a second design of the invention, the movable portion of the lock includes a flange forming the locking lug and the locking means of the movable portion are formed by teeth made on the two sides of a plate extending horizontally from the end of the flange of the U and mate with the notches made on the upper edges of the two flanges of the male section.

This arrangement reduces the shear stresses taken by the teeth and the notches by distributing them on the two sides of the slide.

Preferably, the flange of the female section includes a flange return which extends against the flange of the male section, and which also includes notches with which the locking means mate simultaneously with the notches of the male section. The direct proximity of the notches on the male and female sections mean that all the displacement loads of the sections create only shear stresses on the locking means and no other stresses are transmitted to the other portions of the lock.

The subject of the invention is also an automobile vehicle seat position adjustment system, including two slides such as defined above and where the unlocking control device is a U-shaped bar, the two arms of which are hinged at their ends on snugs extending laterally towards the outside of the system from the sides of the female sections of the two slides and mate with the connecting means of the movable portions of the locks.

The bar ensures the simultaneous unlocking of the locks of the two slides. Its installation, after attachment of the slides both to the frame of the seat and the floor of the vehicle, can be achieved easily. It is done by simply installing the bar by moving its arms apart and by positioning it in alignment with the snugs and the lock connecting means, then by releasing it. The elasticity of the bar then ensures the mating of its arms with the said studs and the connecting means, and it is held in place without the need for other attaching components.

Other characteristics and advantages of the invention will be given in the description which follows of a system for adjusting the position of an automobile seat in compliance with the invention.

BRIEF DESCRIPTION OF THE DRAWINGS

Refer to the appended drawings on which.

DETAILED DESCRIPTION OF THE INVENTION

Figure 1:
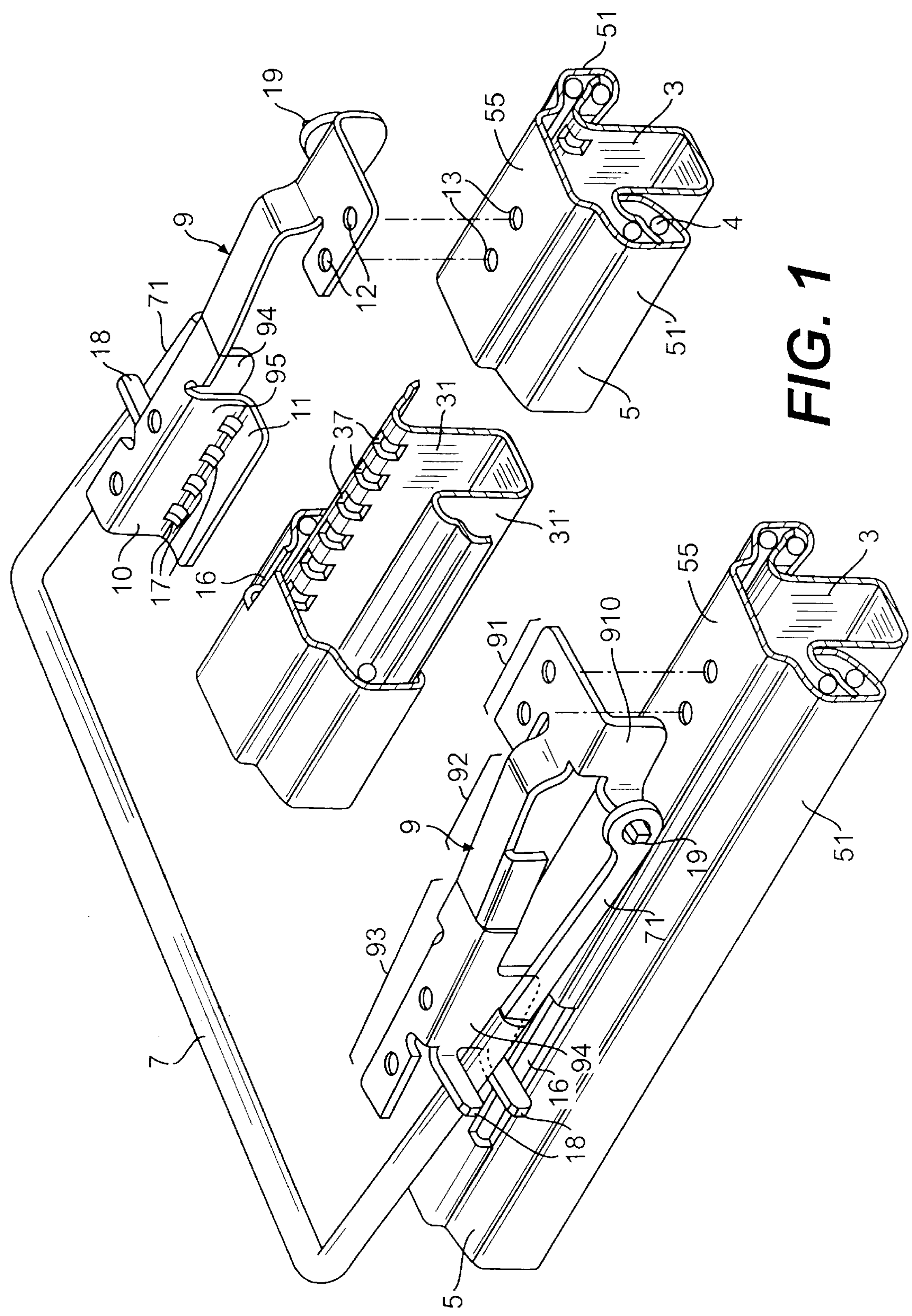
FIG. 1 is a partial view of the system, in perspective and a cutaway view, showing the locks of the two slides, and the unlocking control bar.
Figure 2:
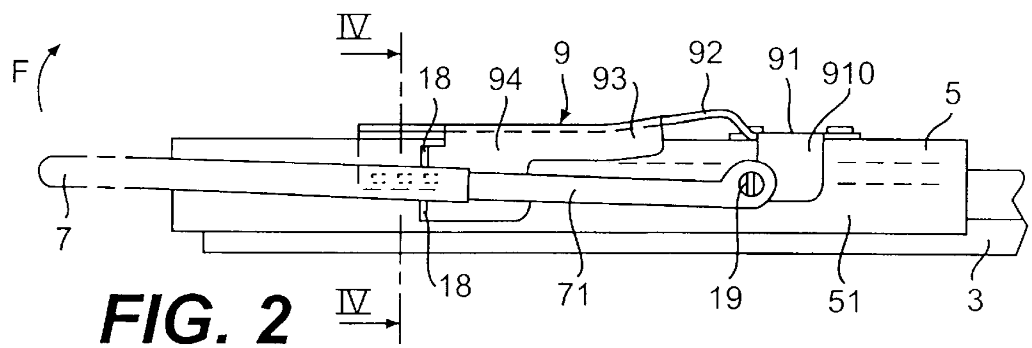
FIG. 2 is a partial lateral view of the slide located the farthest to the left on FIG. 1, in locked position.
Figure 3:
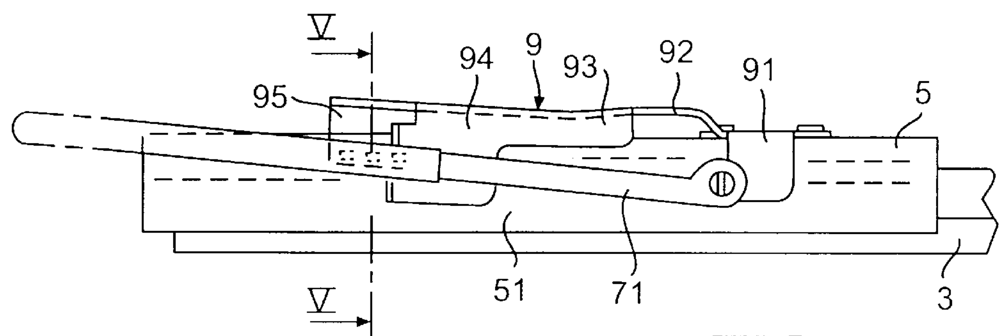
FIG. 3 is a corresponding view in unlocked position.

The seat position adjustment system includes two parallel slides, such as the ones shown on FIG. 1. Each slide is formed by the assembly of a male section 3 on which a female section 5 slides longitudinally, the female section 5 being attached to a frame, not shown, of a seat and the male section 3 being attached to the floor, also not shown, of the automobile vehicle.

Figure 4:
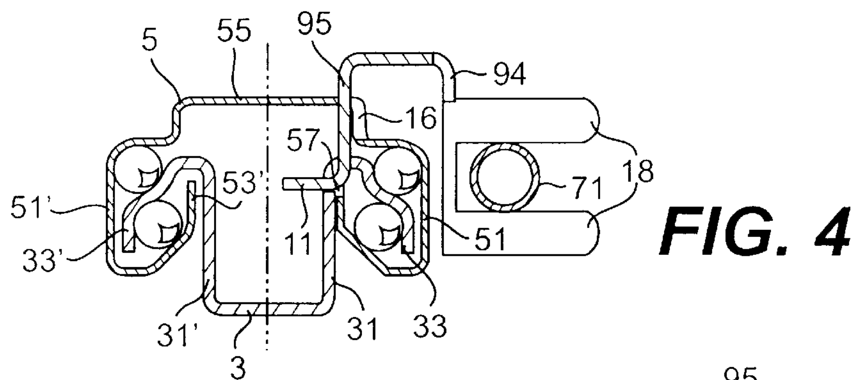
FIG. 4 is a sectional view along line IV-IV of FIG. 2.
Figure 5:
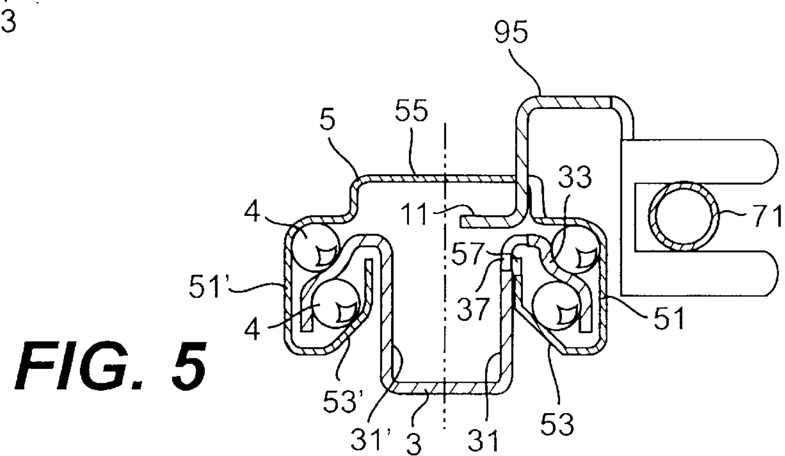
FIG. 5 is a sectional view along line V-V of FIG. 3.

As shown on FIGS. 4 and 5, the female section 5 is generally U-shaped, open at the bottom, with two flanges 51 and 51', the edges of which are folded towards each other to form the flange returns 53 and 53' oriented towards the inside of the section and towards the top.

The male section 3 is also generally U-shaped, open at the top, with flanges 31 and 31' terminating in hook-shaped returns 33, 33' located between flanges 51 and 51' and flange returns 53 and 53' of the female section 5.

The set of flanges, flange returns and hooks of the sections is made up to form a raceway for the balls 4, to facilitate the relative sliding of the sections.

The shapes specifically illustrated on the drawings, the cross-sectional shapes of the sections and their relevant arrangements to achieve relative sliding of the sections can however be modified without falling outside the scope of the invention.

Specific to the invention, a row of locking notches 37 is mace on the upper edge of the flange 31 of the male section, in the angle formed between the latter and the hook-shaped return 33. The locking systems of the two slides are located symmetrically in relation to a vertical central plane of the position adjustment assembly, towards the outside of the said assembly.

Each locking system includes a lock 9 made of a single piece, by cutting out and forming, from a blade of elastically deformable material, in particular spring steel. The lock assembly extends in the longitudinal direction of the slide and successively includes an attaching lug 91, a flexible intermediary portion 92 and a movable portion 93. The attaching lug 91, constituting one end of the lock, is attached to the upper face forming the base 55 of the U of the female section 5, for example by rivets passing through the attaching holes 12 and 13 made respectively in the said attaching lug 91 and in the female section 5. The attaching lug 91 also includes a folded portion 910 which extends against the flange 51 of the female section and from which a snug 19, formed in one piece with the attaching lug, extends crosswise in relation to the direction of the slide and comprises a pivoting axis for an unlocking bar 7, as we will see later on in the text. The flexible intermediary portion 92 comprises an elastically flexible blade extending more or less parallel to the upper face forming the base of the U of the female section 5 and acting as elastic recall means for the movable portion 93 in locking position. The movable portion 93, located at the other end of the lock 9, can therefore move vertically by the bending of the flexible blade 92 and is generally U-shaped in section, open at the bottom, including two flanges 94 and 95 which extend vertically.

The flange 95 forming a locking lug 10, enters into a window 16 made in the upper edge of the female section 5 and is extended inside the slide by a horizontal folded portion 11 crosswise to the slide. Cutouts 17 are made in the angle formed between the folded portion 11 and the flange 95 and mate in locking position with the notches 37 of the male section.

Figure 6:
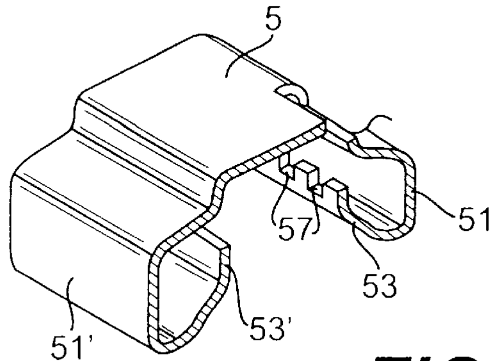
FIG. 6 is a perspective view showing the female section of the slide in the locking area.

In Locking position, the cutouts 17 also mate with the notches 57, more clearly seen on FIG. 6, made on the upper edge of the flange return 53 of the female section 5, only in the area opposite window 16, this edge being located against the upper edge of the flange 31 of the male section. Therefore, the direct proximity of the notches 37 and 57 of the male and female sections means that all the displacement loads of the sections create only shear stresses at the cutouts, no other stresses being transmitted to the other portions of the lock 9.

We will now describe in more detail the means enabling the unlocking of the slide. To unlock the slides and longitudinally adjust the position of the seat, the bar 7, formed for example of a tube bent into a U-shape, includes two arms 71 the ends of which are hinged respectively on snugs 19 of the locks of the two slides. The flange 94 of the movable portion 93 of the lock located on the outside of the slide includes a clip 18 consisting of two lugs formed in one piece with the flange 94 and extending crosswise to the direction of the slides. The arm 71 of the bar is inserted between the two lugs of the clip 18. Thus, a vertical action F on the bar 7 produces a vertical displacement of the movable portion 93 of the lock 9 upwards, which frees the cutouts 17 from the notches 37 and 57 of the sections and thus allows them to slide in relation to each other. Locking is achieved automatically, after the bar 7 has been released, by the elastic recall effect of the flexible portion 92 of the lock.

Figure 7:
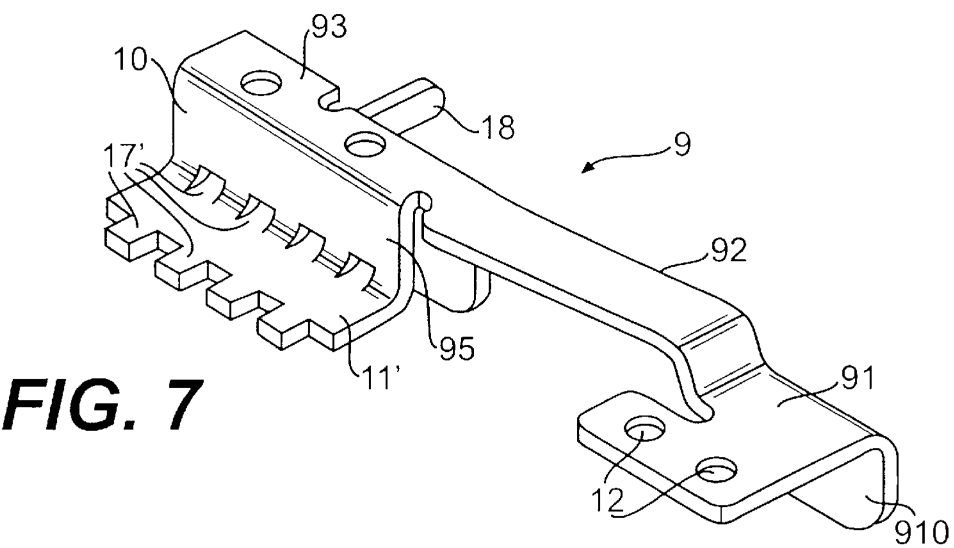
FIG. 7 is a perspective view of a lock in a second design, which can be installed on the slide shown on the right of FIG. 1.
Figure 8:
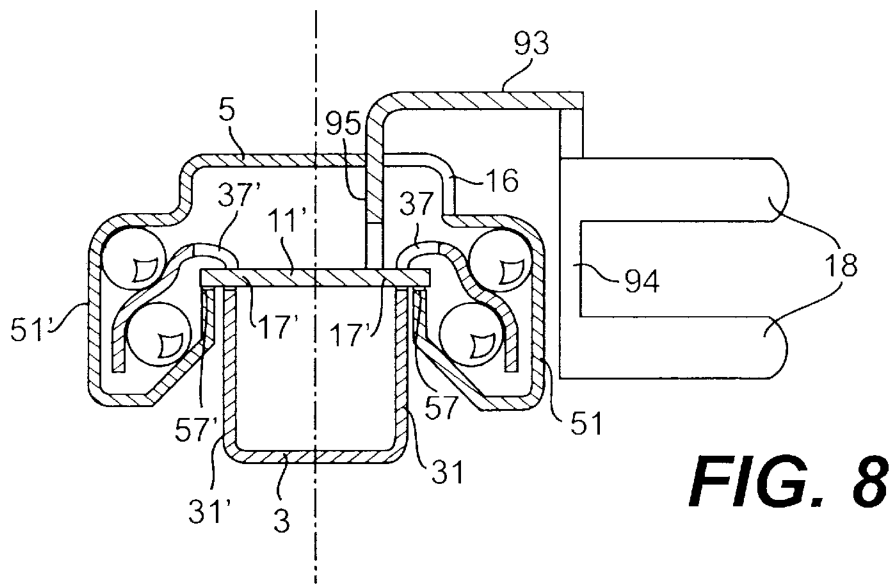
FIG. 8 is a sectional view, corresponding to FIG. 4, in this second design.

FIGS. 7 and 8 show a design variant of the locking means. In this variant, the flange 95 of the U forming the movable portion is prolonged by a plate 11' which extends between the flanges of the male section. The plate 11' includes teeth 17' on each side which mate with the notches 37 and 37' made, in this case, on the upper edge of the two flanges 31 and 31' of the male section 3 and also with the notches 57 and 57' made on the upper edge of the flange returns 53 and 53' of the female section 5.

The invention is not limited to the designs described above only as examples. In particular:

the hinge point of the bar can be modified, for example by replacing snugs 19 by pivots attached to the female section, the clip 18 of the movable portion 93 could include a single lug extending crosswise to the direction of the slide and would fit into a hole made in an arm of the unlocking bar.

We claim:

1. In an adjustment slide for automobile vehicle seats, said adjustment slide including a U-shaped male section having at least one outwardly extending flange at an upper edge, a U-shaped female section slidingly receiving said male section, and a locking mechanism, said locking mechanism comprising:

a one piece unitary member lock lock for securing the male and female sections together, the lock having a fixed first end fastened to the female section, an intermediate flexible portion extending from the fixed end, and a vertically moveable second end portion extending from the flexible portion;

the moveable portion having a locking flange extending through a window formed in an upper surface of the female section;

a set of locking teeth formed in the locking flange that removably mate with a plurality notches formed in an upper edge of the at least one outwardly extending flange of the male section when the male and female sections are secured together;

moveable unlocking device means mounted to the lock for freeing engagement of the locking teeth with the notches when the intermediate flexible portion is elastically deflected upwards.

2. The slide set forth in claim 1 wherein the moveable portion has a generally U-shaped cross section having two arms, the first of which is the locking flange oriented to face downward, the second arm juxtaposed against an outward surface of the female section and including a connection for the unlocking device means.

3. The slide set forth in claim 1 wherein the locking flange is disposed vertically and it extends horizontally at a substantially right angle bend, the locking teeth formed from cutouts along the bend.

4. The slide set forth in claim 1 wherein the locking flange is disposed vertically and it extends horizontally at a substantially right angle bend to a plate portion, the locking teeth formed at opposite longitudinal edges of the plate portion, the teeth engaging notches formed in two flanges at an upper edge of the male section.

5. The slide set forth in claim 1 wherein the female section further includes flanges terminating outwardly in flange returns, the at least one flange of the male section extending against a correspondingly positioned flange of the female section, the locking teeth engaging notches in the flange return simultaneously with the notches in the male section flange.

6. In an adjustment system for automobile vehicle seats and including two parallel slides, each slide having a U-shaped male section having at least one outwardly extending flange at an upper edge, a U-shaped female section slidingly receiving said male section, and each slide having a locking mechanism, said locking mechanism comprising:

a one piece unitary member lock lock for securing the male and female sections together, the lock having a fixed first end fastened to the female section, an intermediate flexible, portion extending from the fixed end, and a vertically moveable second end portion extending from the flexible portion;

the moveable portion having a locking flange extending through a window formed in an upper surface of the female section;

a set of locking teeth formed in the locking flange that removably mate with a plurality of notches formed in an upper edge of the at least one outwardly extending flange of the male section when the male and female sections are secured together;

moveable unlocking device means mounted to the locks of each slide for freeing engagement of the locking teeth with the notches when the intermediate flexible portion is elastically deflected upwards at each slide, the unlocking device means having a U-shaped bar with two arms rotatably mounted at their ends on pivots extending laterally from the female sections;

the moveable portion further having a generally U-shaped cross section including two arms, the first of which is the locking flange oriented to face downward, the second arm juxtaposed against an outward surface of the female section and includes a connector for receiving the unlocking device means.

7. The adjustment system set forth in claim 6 wherein each pivot is integrally formed with a folded portion extending from a respective fixed end of a corresponding lock, the folded portion resting against a correspondingly positioned female section flange.

8. The system set forth in claim 7 wherein the connector is a clip integrally formed from the second arm of the U-shaped moveable portion and extending transversely therefrom.

9. The system set forth in claim 7 wherein the unlocking device bar is normally biased in a locked position by the intermediate flexible portion that is elastically deformed.

10. A vehicle seat adjustment system having at least two tracks, each track comprising:

a stationary female member;

a male member slidably mounted in the female member;

a one piece unitary member lock locking device for removably securing the male member in the female member, the device having a first end secured to the female member, an intermediate flexible section, and a vertically displaceable second end section;

the second end section having an L-shaped flange received within a slot formed in an upper surface of the female member, a set of teeth longitudinally extending along a bend in the flange and normally engaging a) a row of longitudinally extending notches formed in an upper surface portion of the male member; and b) a row of longitudinally extending notches formed in a flange return of the female member, the return underlying an outwardly extending flange of the male member;

whereby vertical displacement of the locking device removes the teeth from the engaged notches thereby allowing sliding movement of the male member within the female member.

11. A vehicle seat adjustment system having at least two tracks, each track comprising:

a stationary female member;

a male member slidably mounted in the female member;

a unitary locking device for removably securing the male member in the female member, the device having a first end secured to the female member, an intermediate flexible section, and a vertically displaceable second end section;

the second end section having an L-shaped flange received within a slot formed in an upper surface of the female member, a first set of teeth longitudinally extending along a bend in the flange and a second set of teeth longitudinally extending along an outer edge of the flange, the two sets of teeth normally respectively engaging a) two parallel rows of longitudinally formed notches in an upper surface portion of the male member; and b) two rows of longitudinally formed notches in flange returns of the female member, the returns underlying outwardly extending flanges of the male member;

whereby vertical displacement of the locking device removes the teeth from the engaged notches thereby allowing sliding movement of the male member within the female member.

* * * * *